(12) United States Patent
Reif et al.

(10) Patent No.: US 12,552,467 B2
(45) Date of Patent: Feb. 17, 2026

(54) DRIVE DEVICE FOR A HATCH

(71) Applicant: Stabilus GmbH, Koblenz (DE)

(72) Inventors: Thomas Reif, Kobern-Gondorf (DE); Jörg Hillen, Nörtershausen (DE)

(73) Assignee: Stabilus GmbH, Koblenz (DE)

( * ) Notice: Subject to any disclaimer, the term of this patent is extended or adjusted under 35 U.S.C. 154(b) by 356 days.

(21) Appl. No.: 18/334,985

(22) Filed: Jun. 14, 2023

(65) Prior Publication Data

US 2023/0339550 A1  Oct. 26, 2023

Related U.S. Application Data

(63) Continuation-in-part of application No. 17/409,292, filed on Aug. 23, 2021, now Pat. No. 12,044,053.

(30) Foreign Application Priority Data

Aug. 24, 2020  (DE) ..................... 10 2020 122 059.6

(51) Int. Cl.
 *B62D 33/03* (2006.01)
 *B60P 1/26* (2006.01)
 *E05F 15/627* (2015.01)

(52) U.S. Cl.
 CPC ............. *B62D 33/03* (2013.01); *B60P 1/26* (2013.01); *E05F 15/627* (2015.01); *E05Y 2201/654* (2013.01); *E05Y 2900/544* (2013.01)

(58) Field of Classification Search
 CPC ... B62D 33/0273; B62D 33/03; E05F 15/627; E05Y 2201/652; E05Y 2201/654; E05Y 2900/544; B60P 1/26
 See application file for complete search history.

(56) References Cited

U.S. PATENT DOCUMENTS 5,449,212 A    9/1995  Seifert
5,954,383 A *  9/1999  Beck .................. B62D 33/0273
                                                   296/57.1

(Continued)

FOREIGN PATENT DOCUMENTS

CN    201763096 U    3/2011
CN    103832484 A    6/2014
(Continued)

OTHER PUBLICATIONS

Computer translation of EP 4437922 (Year: 2024).*

(Continued)

*Primary Examiner* — Gregory A Blankenship
(74) *Attorney, Agent, or Firm* — Kilpatrick Townsend & Stockton LLP

(57) ABSTRACT

A drive device for a hatch, in particular for a tailgate, comprising a cable, which is connected at one end to a cable pulley, which is configured to wind or unwind the cable according to the direction of rotation of the cable pulley, wherein the cable pulley is connected to a first superordinate assembly, such as a vehicle body, and which is connected at its other end to a second superordinate assembly, such as the hatch, which is pivotably attached relative to the first superordinate assembly, comprising an actuator, which is configured to drive the cable pulley, wherein the drive device furthermore comprises at least one deflection unit which has a deflection roll over which the cable runs between the cable pulley and the hatch.

20 Claims, 10 Drawing Sheets

(56) References Cited

U.S. PATENT DOCUMENTS

| | | | |
|---|---|---|---|
| 6,068,321 | A | 5/2000 | Ooms |
| 6,145,917 | A | 11/2000 | Ishii et al. |
| 6,196,608 | B1 | 3/2001 | Ooms |
| 8,070,208 | B2 | 12/2011 | Zielinsky |
| 8,087,710 | B2 | 1/2012 | Zielinsky |
| 8,109,553 | B2 | 2/2012 | Zielinsky |
| 8,684,441 | B2 | 4/2014 | Kerr |
| 9,956,995 | B1 | 5/2018 | Neighbors et al. |
| 10,081,303 | B1 | 9/2018 | Ngo et al. |
| 11,220,301 | B2 | 1/2022 | Robinson et al. |
| 11,345,418 | B2 | 5/2022 | Lakerdas et al. |
| 12,044,053 | B2 * | 7/2024 | Reif ............ E05F 15/627 |
| 2006/0242909 | A1 | 11/2006 | Arquevaux |
| 2009/0108613 | A1 | 4/2009 | Krajenke |
| 2009/0189406 | A1 | 7/2009 | Gleason |
| 2010/0109368 | A1 * | 5/2010 | Marshall ......... B62D 33/0273 |
| | | | 296/57.1 |
| 2013/0038081 | A1 | 2/2013 | Kerr |
| 2014/0182207 | A1 * | 7/2014 | Kerr, III ............ E05F 15/40 |
| | | | 49/31 |
| 2016/0160553 | A1 | 6/2016 | Nania |
| 2017/0009508 | A1 | 1/2017 | Hunt et al. |
| 2017/0106921 | A1 * | 4/2017 | Norfleet ............ B62D 33/027 |
| 2018/0195332 | A1 | 7/2018 | Martins et al. |
| 2018/0290693 | A1 | 10/2018 | Ogden et al. |
| 2019/0301231 | A1 | 10/2019 | Gabbianelli et al. |
| 2019/0330907 | A1 * | 10/2019 | Marchlewski ..... B62D 33/0273 |
| 2021/0155297 | A1 | 5/2021 | Lakerdas et al. |
| 2021/0171127 | A1 | 6/2021 | Harris et al. |
| 2022/0056750 | A1 * | 2/2022 | Reif ................. B62D 33/0273 |
| 2023/0339550 | A1 * | 10/2023 | Reif ................. B62D 33/03 |
| 2025/0033710 | A1 * | 1/2025 | Taylor ............. E05B 15/004 |

FOREIGN PATENT DOCUMENTS

| | | | | |
|---|---|---|---|---|
| CN | 207241824 | U | 4/2018 | |
| CN | 109477354 | A | 3/2019 | |
| CN | 209799670 | U | 12/2019 | |
| DE | 112010003488 | T5 | 10/2012 | |
| DE | 202015106598 | U1 | 12/2015 | |
| DE | 202017107230 | U1 | 12/2017 | |
| EP | 4437922 | A1 * | 10/2024 | ........... F24C 15/023 |
| FR | 2885159 | A1 | 11/2006 | |
| JP | 2001182425 | A | 7/2001 | |

OTHER PUBLICATIONS

U.S. Appl. No. 17/409,292, Notice of Allowance mailed Jun. 3, 2024, 5 pages.
U.S. Appl. No. 17/409,292, Non-Final Office Action mailed Mar. 20, 2024, 10 pages.
Chinese Application No. 202110968074.4, "Office Action", Oct. 26, 2022, 6 pages.
German Application No. 102020122059.6, "Office Action", Sep. 22, 2021, 4 pages.
German Application No. 102020122059.6, "Search Report", Aug. 3, 2021, 4 pages.

* cited by examiner

DRIVE DEVICE FOR A HATCH

CROSS REFERENCE TO RELATED APPLICATIONS

This application is a continuation in part of U.S. patent application Ser. No. 17/409,292, filed Aug. 23, 2021, which claims priority to German Patent Application No. 10 2020 122 059.6, filed in Germany on Aug. 24, 2020, which are herein incorporated by reference in their entireties for all purposes.

FIELD

The present invention relates to a drive device for a hatch, in particular for a tailgate, comprising a cable, which is connected at one end to a cable pulley, which is configured to wind or unwind the cable according to the direction of rotation of the cable pulley, wherein the cable pulley is connected to a first superordinate assembly, such as a vehicle body, and which is connected at its other end to a second superordinate assembly, such as the hatch, which is pivotably attached relative to the first superordinate assembly, comprising an actuator, which is configured to drive the cable pulley, wherein the drive device furthermore comprises at least one deflection unit which has a deflection roll over which the cable runs between the cable pulley and the hatch.

BACKGROUND

Drive devices for hatches, in particular for tailgates, which are attached, for example, as drop hatches to the rear of a pick-up truck, are known from the prior art. The hatches can be operated either by motor or by hand between a closed position and an open position. However, closing the hatch entirely by hand can be uncomfortable for an operator, due to the heavy weight of the tailgate. Equally disadvantageous are the cable forces created by the tailgate weight for fastening the drive device to the vehicle body.

BRIEF SUMMARY

It is therefore the object of the present invention to provide a drive device for a hatch which enables the hatch to be operated comfortably. At the same time, the proposed drive device is to be optimized with regard to the rope forces generated by the tailgate weight.

According to the invention, this object is achieved by a drive device for a hatch, in particular for a tailgate, comprising a cable, which is connected at one end to a cable pulley, which is configured to wind or unwind the cable according to the direction of rotation of the cable pulley, wherein the cable pulley is connected to a first superordinate assembly, such as a vehicle body, and which is connected at its other end to a second superordinate assembly, such as the hatch, which is pivotably attached relative to the first superordinate assembly, comprising an actuator, which is configured to drive the cable pulley, wherein the drive device furthermore comprises at least one deflection unit which has a deflection roll over which the cable runs between the cable pulley and the hatch, the rope having two interconnected sections, a first section being provided as a sling cable and a second section being provided as a pull cable.

The first section is further connected by its first end to the hatch and by its second end by means of a cable coupling to a first end of the second section, the second end of which is connected to the cable pulley, wherein the sling cable is sized in such a way that the sling cable is tensioned when an angle between the hatch and the body is substantially 180°, in particular of about 90°, and wherein the second section is sized such that the cable coupling cannot be wound into the cable pulley.

The first section of the rope serves as a sling cable which, in the open position, can absorb the high weight and loading forces in the open position of the hatch. By being connected in series with the second section of the rope, the sling cable is pulled over the deflection unit in the direction of the cable pulley when the hatch is closed and no longer forms an undefined cable loop between the hatch and the vehicle body. By arranging the deflection pulley, force vectors of forces acting within the cable can be deflected, so that in particular the forces acting on the cable ends can act in a preferred direction on a corresponding attachment point.

Due to the connection by means of the cable coupling, the two sections can have different thicknesses. In particular, the first section is provided as a thick cable in order to be able to absorb the high forces. The second section, which serves as the pull cable and only has to absorb lower forces, can be provided as a thinner pull cable so that a diameter of the cable pulley can be dimensioned accordingly small.

Preferably, the cable can comprise a stop element which is configured to come into contact with a counter stop formed on the deflection unit at an angle between the hatch and the vehicle body of approximately 180°, in particular of approximately 90°, so as to prevent forces exerted on the first section of the cable by the hatch from being introduced into the cable pulley.

That is to say that, because the cable with the stop element rests against the counter stop, high forces from the hatch, which arise for example when loading the hatch, can be introduced into the first section and then transmitted at the stop element out of the first section and into the counter stop or the deflection unit.

In this way, forces on the section of the cable which extends from the stop element to the cable pulley can be reduced, and a load on the cable pulley can thereby be reduced. The deflection unit is preferably arranged on the D-pillar of the vehicle body, where there is a high level of vehicle strength.

According to an advantageous embodiment of the invention, the cable coupling can be designed as a stop element. It is also possible within the scope of the invention to attach the stop element to the sling cable as a separate component positioned in front of the cable coupling.

A particularly advantageous further development of the invention provides that a support element is arranged between the deflection unit and the cable pulley, the cable being guided by the support element. This allows the entire drive device to act as a self-contained unit with frictional locking. The cable forces acting on the hatch, which arise for example when the hatch is closed by the drive device, no longer have to be absorbed by an actuator housing and its attachment points in the vehicle. The cable forces are transmitted through the actuator housing directly into the support element, which is also supported on the deflection unit. This means that the drive device is virtually force-free and no forces are introduced into the side wall of the vehicle. Strength considerations with regard to the system forces on the pull cable can thus be dispensed with. Only the positioning and the system weight of the drive device have to be secured to the side wall of the vehicle. Moreover, the cable can be guided in a sliding manner, for example, by means of the stop element in the support element.

It is particularly advantageous in this respect to form the support element as a C-shaped rail and to arrange it on the vehicle body. A length of the C-shaped rail and, with it, the distance between the cable pulley and the counter stop is designed such that the cable coupling is moved in the rail between the counter stop and the actuator housing. This positions the actuator and the cable pulley away from the D-pillar in the direction of travel. Depending on the design, the components of the drive device can also be arranged recessed in the side wall of the vehicle and/or behind a side wall panel, for example.

Preferably, a torsion bar is provided, which is configured to generate a corresponding counter-torsional moment upon input of a torsional force into the torsion bar, wherein the torsion bar is further supported on at least one of the first and the second superordinate assemblies in such a manner that it can be moved between a first state of the torsion bar, which is associated in particular with a closed position of the hatch on the vehicle body, and a second state of the torsion bar, which is associated in particular to a maximally open position of the hatch on the vehicle body, wherein the torsion bar is arranged in such a way that it is configured to apply a torque in a first direction over a first partial movement range of a total possible movement range between the first and the second state of the torsion bar, wherein the first partial movement range extends from the first state of the torsion bar along the possible movement range in the direction of the second state of the torsion bar, wherein the torsion bar is further arranged in such a manner that it is configured to apply a torque in a second direction opposite to the first direction over a second partial movement range of the total possible movement range, wherein the second partial movement range extends from the second state of the torsion bar along the possible movement range in the direction of the first state of the torsion bar, and wherein the torsion bar is further arranged in such a way that it is configured not to apply any torque over a third partial movement range which is arranged between the first and the second partial movement ranges.

As a result, it is possible, on the one hand, to support and thus facilitate the closing of the hatch, for example from a horizontal orientation of the hatch, while on the other hand, the arrangement according to the invention can weaken a force with which the hatch reaches an end point of the movement range, for example if the hatch is released during opening. Weakening the force when the hatch drops down makes it possible in particular to reduce the load on bearing components of the hatch on the vehicle body or the like. Furthermore, the hatch opening process can be supported, for example, in the case in which a vehicle is parked in a downhill direction, in which case the hatch will be opened, at least initially, against the force of gravity.

Since the effect of the torsion bar depends on its torsional moment being exerted between the hatch and the assembly to which the hatch is attached, the torsion bar can either be attached to the hatch and supported on the higher-level assembly or attached to the higher-level assembly and supported on the hatch. The torsion bar can advantageously be arranged such that the torsion axis about which the torsion bar exerts the torsional moment is coaxial with a pivot axis of the hatch on the vehicle body.

In particular, the torsion bar can have at least one projection which is designed to engage in a recess formed in one of the first and second superordinate assemblies, wherein a movement path of the projection in the recess corresponds to the third partial movement range. As such, there is no support of the torsion bar over the third partial movement range, on either the hatch or the vehicle body, depending on which element the torsion bar is not attached to. When the end of the third partial movement range is reached, the projection can be supported on an edge of the recess, which defines a start of the first or the second partial movement range.

Furthermore, the total possible movement range of the torsion bar can extend over an angular range of at least 50° and at most 180°, in particular over an angular range of approximately 90°.

In a further development of the present invention, the cable pulley can be provided with a unidirectional clutch which is designed to mount the cable pulley with free rotation relative to the actuator in the direction of rotation of the cable pulley in which the cable is wound onto the cable pulley, and to mount the cable pulley in a torque-proof manner relative to the actuator in the other direction of rotation of the cable pulley. As is generally known for a unidirectional clutch, a clamping device can be arranged between a portion of the cable pulley which is connected to the cable and a portion of the cable pulley, which is connected to the actuator, which clamping device allows a rotation of the two portions relative to each other in one direction of rotation and forms the torque-proof mount of the cable pulley in the other direction of rotation. For example, blocking positions can be provided at regular intervals, in which a clamping device designed as a locking device can prevent a relative rotation of the cable pulley and the actuator. The clamping device can advantageously be designed as a ball- or roller clutch. A ball- or roller clutch can offer the advantage that, regardless of a momentary position of the clutch, upon a rotation in the blocking direction of the clutch, an almost immediate clamping effect of the clamping device can be achieved. A relative movement of the cable pulley with respect to the actuator in the blocking direction in order to actuate the clamping device should, however, not be regarded as a "rotatable mounting" in the context of the present invention.

A coil spring which is configured to exert a torque on the cable pulley in the winding direction of the cable pulley can be assigned to the unidirectional clutch, such that the cable pulley is rotated relative to the actuator when the cable tension is released. This can make it possible that, in the event that the hatch is closed by motor and is additionally moved manually in the direction of the closed position, a decrease in cable tension is compensated for by the coil spring. The cable pulley can be displaced in relation to the actuator using the unidirectional clutch. This can prevent the cable from being able to escape from a guide of the cable pulley. Of course, a different elastic preload element can also be used instead of a coil spring.

For example, the actuator can comprise an electric motor and a worm connected to the output side of the electric motor, which worm meshes with a worm gear which forms a portion of the cable pulley. The worm gear can be connected to the cable pulley or formed in one piece with it.

In a further aspect, the present invention relates to a hatch arrangement, comprising: a hatch, a vehicle body to which the hatch is connected with articulation and which comprises a portion to be closed off by the hatch, a drive device configured for the hatch.

When using a torsion bar which is arranged to generate a corresponding counter-torsion moment in response to an input of a torsion force into the torsion bar, the first state of the torsion bar is associated with a closed state of the flap on the vehicle body and the second state of the torsion bar is associated with a maximum open state of the flap on the vehicle body.

It should be noted that "maximally open" can mean "maximally open to the extent allowed". That is to say, a maximum opening of the hatch does not necessarily have to correspond to a maximum opening of the portion closed off by the hatch.

The torsion bar can be connected to the hatch in a torque-proof manner, and the torsion bar can have a projection which is designed to engage in a recess formed on the body, wherein a movement path of the projection in the recess between two end stops of the recess corresponds to the third partial movement range, a contact of the projection against one end stop of the recess corresponds to a beginning of the first partial movement range, which then extends up to the first state of the torsion bar, and a contact of the projection against the other end stop of the recess corresponds to a start of the second partial movement range, which then extends up to the second state of the torsion bar.

Furthermore, if a hatch arranged in its closed position relative to the vehicle body corresponds to an angle of 0°, the first partial movement range corresponds to an angular range of 0° to approximately 20°, the second partial movement range corresponds to an angular range of approximately 40° to a maximum of 180°, and the third partial movement range corresponds to an angular range of approximately 20° to approximately 40°. That is, in the angular range from 0° to about 20°, the torsion bar generates a torque in the opening direction of the hatch; in the angular range from about 20° to about 40°, the torsion bar generates no torque; and in the angular range from about 40° to a maximum of 180°, the torsion bar generates a torque in the closing direction of the hatch.

The position in an angular range of about 20° to about 40° is suitable for unhooking the tailgate, if the hinge construction allows, after detaching the cable, i.e., removing the cable from the hatch, which is then wound up via the coil spring, in order to allow uninstalling the tailgate, for example for special transport trips or loading. Below this torsion moment-free opening angle, the cable can be attached once again to the hatch—and the cable can be moved out of the wound position manually or by an electric motor for this purpose.

BRIEF DESCRIPTION OF THE DRAWINGS

The present invention will be described in greater detail below using an embodiment, with reference to the accompanying drawings. In the drawings.

DETAILED DESCRIPTION

Figure 1:
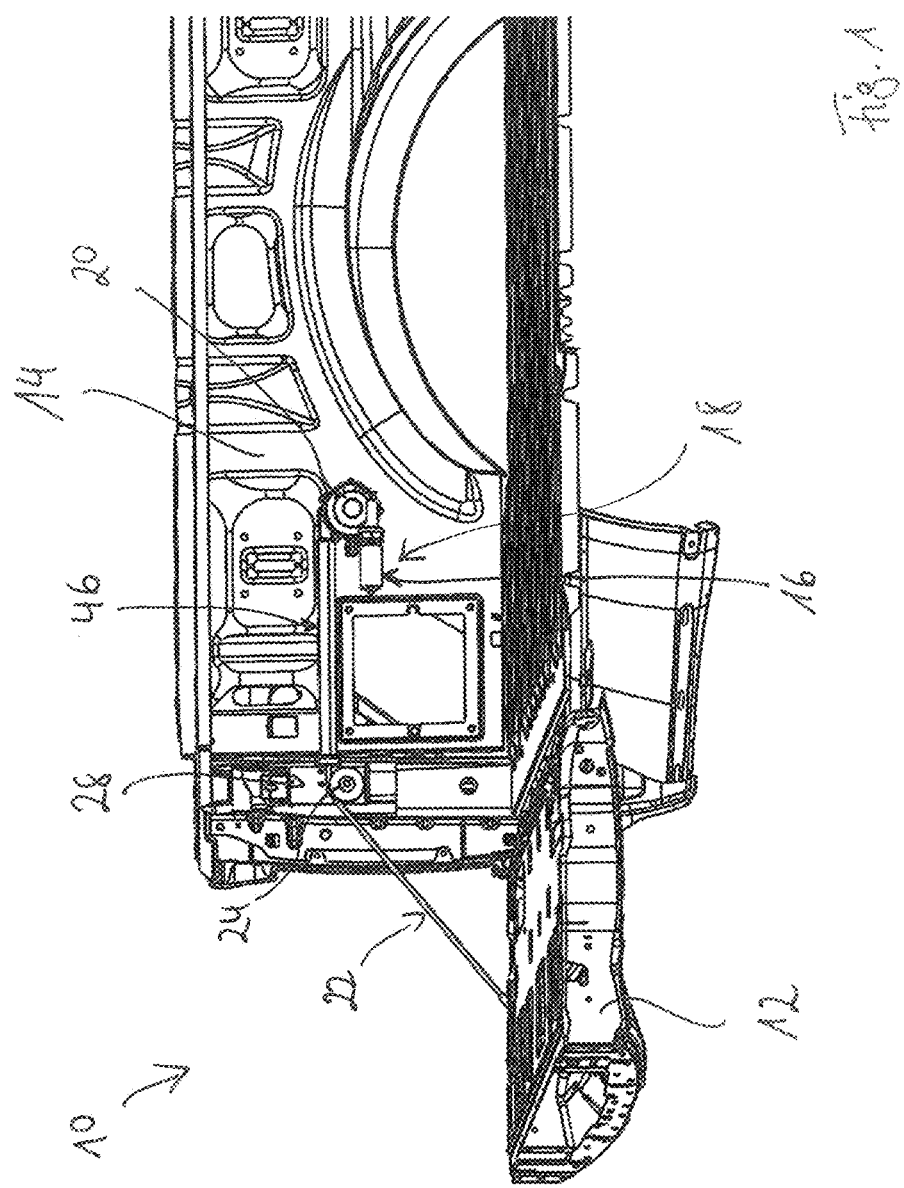
FIG. 1 a perspective section of the hatch arrangement according to the invention with a drive device according to the invention.

In FIG. 1, a hatch arrangement according to the invention is indicated overall by the reference sign 10. The hatch arrangement 10 comprises a hatch 12 and a vehicle body 14, the hatch 12 being pivotable relative to the hatch 14 via a hinge with an associated pivot axis. The hatch 12 attached to the rear of the vehicle body 14 can be referred to as a so-called tailgate.

The hatch arrangement 10 further comprises a drive device 18 according to the invention, which in turn comprises an actuator 16, a cable pulley 20 to be driven by means of the actuator 16, and a cable 22 which is connected at one end to the cable pulley 20 and at its other end to the hatch 12. The cable 22 runs between the cable pulley 20 and the hatch 12 over a deflection roll 24 of a deflection unit 28 in such a manner that the cable 22 initially extends from the cable pulley 20 to the deflection roll 24 substantially horizontally, and from the deflection roll 24 to the hatch 12 approximately at an angle of 45° relative to the horizontal.

Figure 2:
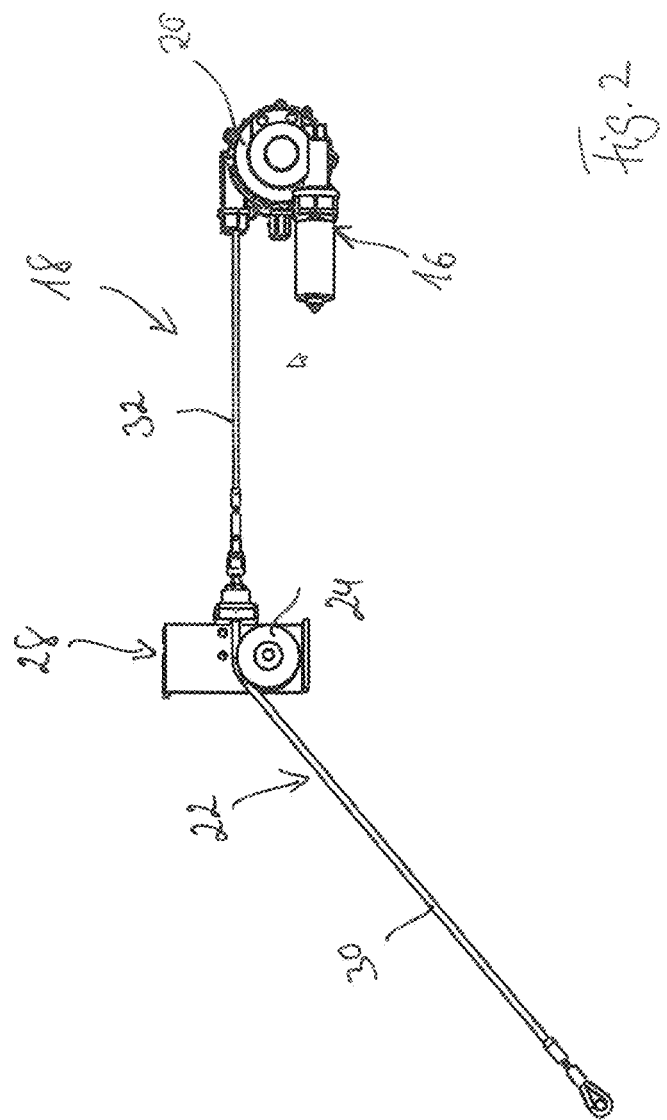
FIG. 2 is a lateral cross-sectional view of a drive device according to the invention.

As can be seen in particular from FIG. 2, which shows a side view of the drive device 18, the cable 22 having two interconnected sections 30, 32, a first section 30 being provided as a sling cable and a second section 32 being provided as a pull cable.

The sling cable is connected by its first end to the hatch 12 and by its second end by means of a cable coupling 34 to a first end of the pull cable, the second end of which is connected to the cable pulley 20.

Thereby, the sling cable is sized in such a way that the sling cable is tensioned when an angle between the hatch 12 and the vehicle body 14 is substantially 180°, in particular of about 90°. Furthermore, the pull cable is sized such that the cable coupling 34 cannot be wound into the cable pulley 20. As explained above, the first section 30 of the cable 22 serves as a sling cable which, in the open position, can absorb the high weight and loading forces in the open position of the hatch 12.

The first section 30 is connected in series with the second section 32, which serves as a pull cable for opening and closing the hatch 12 and is connected by means of the rope coupling 34. The two sections 30, 32 have different thicknesses. In particular, the first section 30 is provided as a thick cable in order to be able to absorb the high weight and loading forces. The second section 32, on the other hand, only has to absorb smaller forces and can therefore be provided as a thinner traction cable so that a diameter of the cable pulley 20 can be dimensioned accordingly small.

Figure 3:
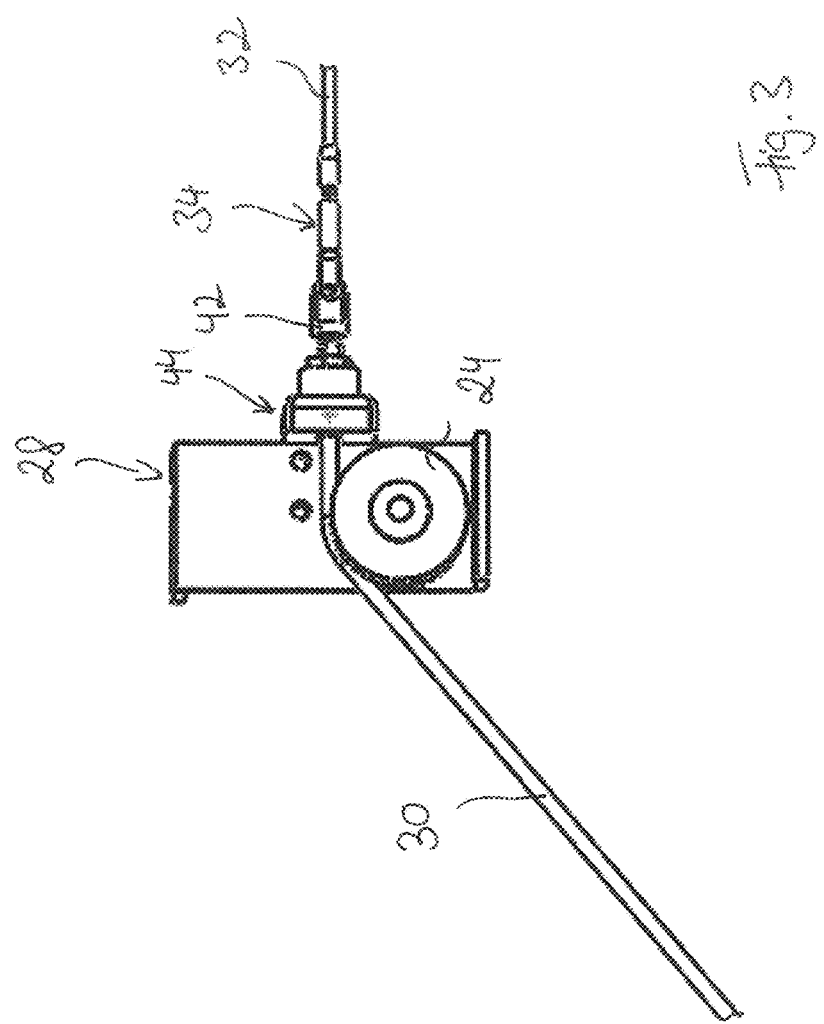
FIG. 3 is an enlarged section of the cross-sectional view according to FIG. 2.

FIG. 3 shows an enlarged section of the drive device 18. The cable 22 has a stop element 42 which is configured to come into contact with a counter stop 44 formed on the deflection unit 28 at an angle between the hatch 12 and the vehicle body 14 of approximately 180°, in particular of approximately 90°, so as to prevent forces exerted on the first section 30 of the cable 20 by the hatch 12 from being introduced into the cable pulley 20.

That is to say that, because the cable 22 with the stop element 42 rests against the counter stop 44, high weight and loading forces on the hatch 12 can be introduced into the first section 30 and then transmitted at the stop element 42 out of the first section 30 and into the counter stop 44 of the deflection unit 28, which is preferably arranged on the D-pillar of the vehicle body 14, where there is a high level of vehicle strength.

The cable coupling 34 can be designed as a stop element 42. However, the stop element 42 can also be attached to the sling cable as a separate component positioned in front of the cable coupling 34.

Figure 4:
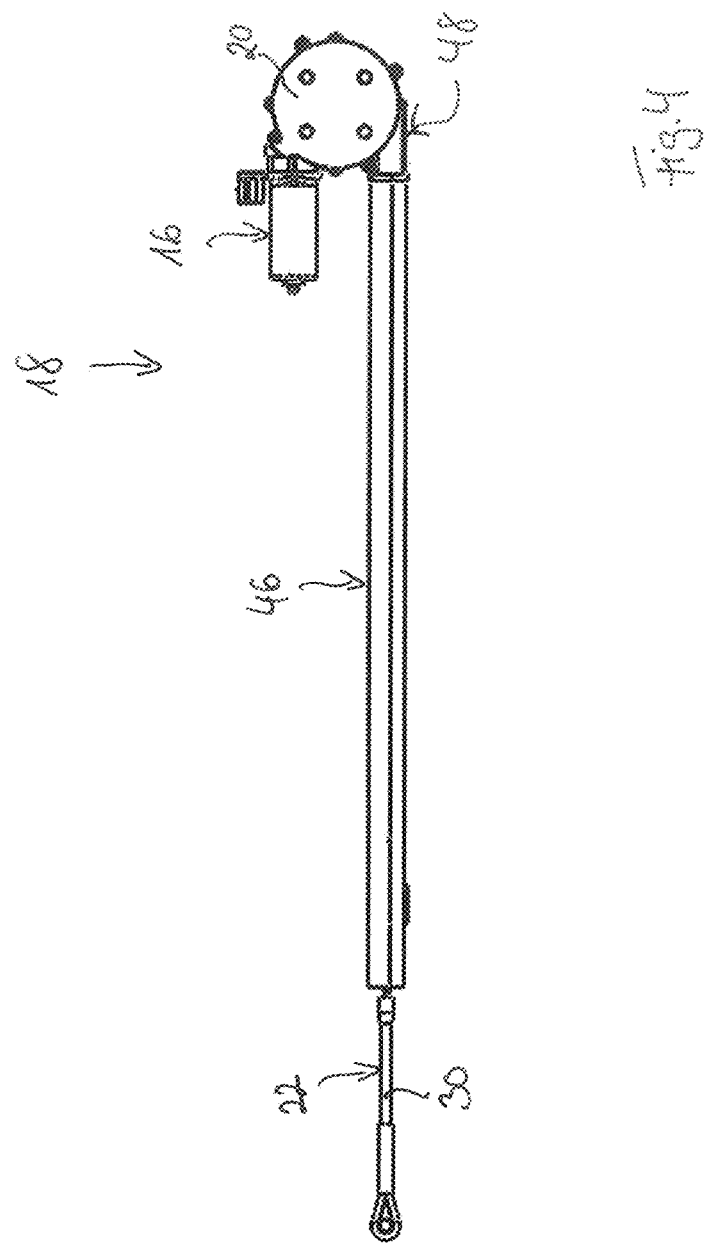
FIG. 4 is a further cross-sectional view of the drive device according to the invention.

A support element 46 is arranged between the deflection unit 28 and the cable pulley 20, the cable 22 being guided by the support element 46 shown, for example, in FIG. 4.

Preferably, the support element 46 is formed as a C-shaped rail arranged on the vehicle body 14.

Figure 5:
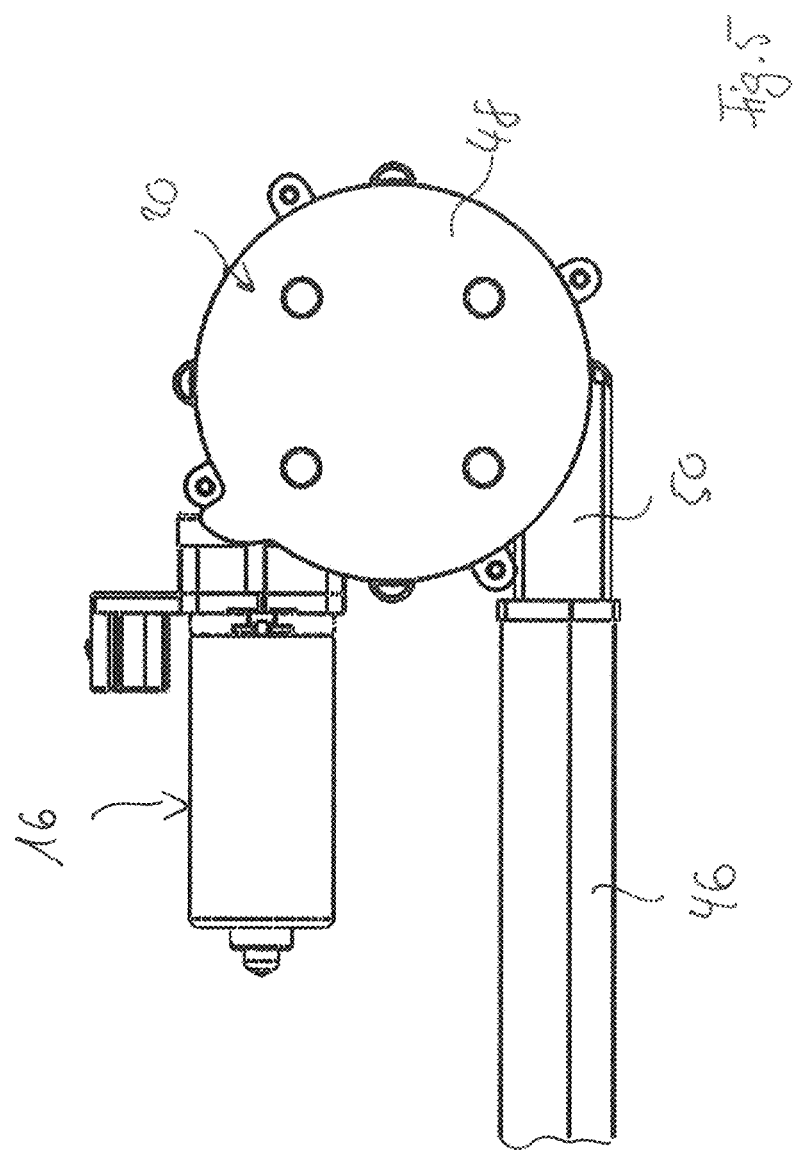
FIG. 5 is an enlarged section of the cross-sectional view according to FIG. 4.

As can be seen from FIG. 5, the support element 46 is connected to a pulley housing 48 of the pulley 20 via a retaining element 50, wherein the retaining element 50 can serve to hold housing halves of the pulley housing 48 together.

A length of the C-shaped rail and, with it, the distance between the cable pulley 20 and the counter stop 44 is designed such that the cable coupling 34 is moved in the rail between the counter stop 44 and the actuator housing 48. This positions the actuator and the cable pulley 20 away from the D-pillar in the direction of travel.

Figure 6:
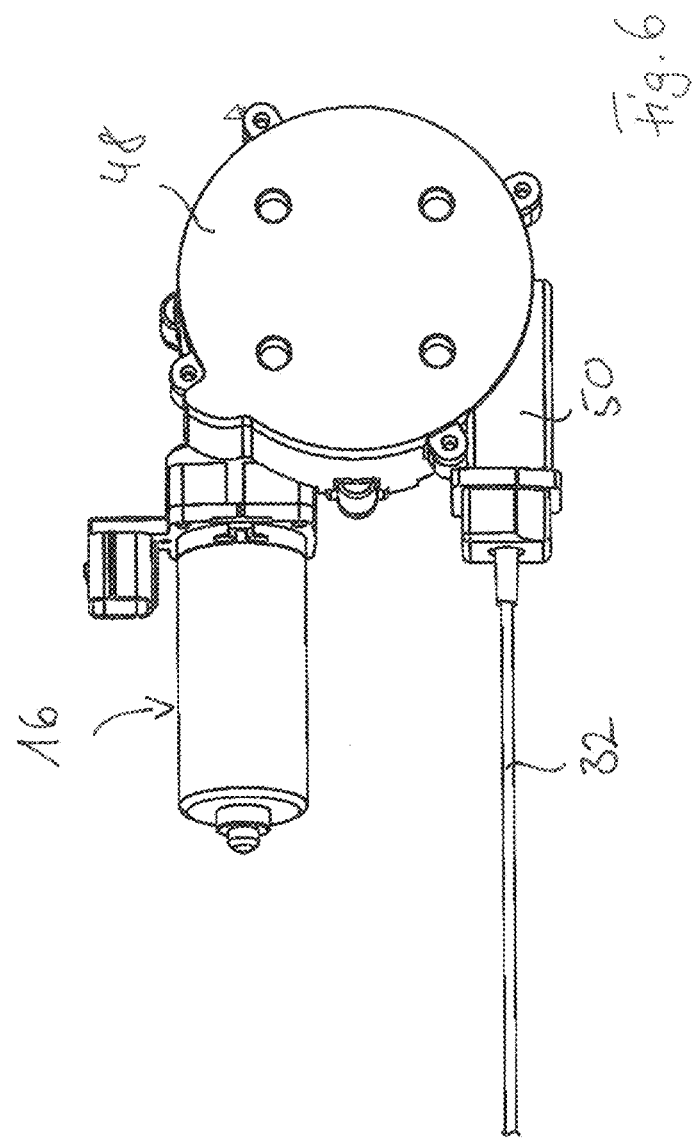
FIG. 6 is a further enlarged section of the cross-sectional view according to FIG. 4.

FIG. 6 again shows a section of the drive device 18 without the support element 46.

Advantageously, the cable pulley 20 can be provided with a unidirectional clutch which is designed to mount the cable pulley 20 with free rotation relative to the actuator 16 in the direction of rotation of the cable pulley 20 in which the cable 22 is wound onto the cable pulley 20, and to mount the cable pulley 20 in a torque-proof manner relative to the actuator 16 in the other direction of rotation of the cable pulley 20. As is generally known for a unidirectional clutch, a clamping device can be arranged between a portion of the cable pulley 20 which is connected to the cable 22 and a portion of the cable pulley, which is connected to the actuator, which clamping device allows a rotation of the two portions relative to each other in one direction 16 of rotation, and forms the torque-proof mount of the cable pulley 20 in the other direction of rotation. For example, blocking positions can be provided at regular intervals, in which a clamping device designed as a locking device can prevent a relative rotation of the cable pulley 20 and the actuator 16. The clamping device can advantageously be designed as a ball- or roller clutch. A ball- or roller clutch can offer the advantage that, regardless of a momentary position of the clutch, upon a rotation in the blocking direction of the clutch, an almost immediate clamping effect of the clamping device can be achieved. A relative movement of the cable pulley 20 with respect to the actuator 16 in the blocking direction in order to actuate the clamping device should, however, not be regarded as a "rotatable mounting" in the context of the present invention.

For example, the actuator 16 may include an electric motor and a worm connected to the output side of the electric motor, which worm meshes with a worm wheel that forms a portion of the cable pulley 20. The worm wheel may be connected to or integral with the cable pulley 20.

A coil spring which is configured to exert a torque on the cable pulley in the winding direction of the cable pulley can be assigned to the unidirectional clutch, such that the cable pulley is rotated relative to the actuator when the cable tension is released. This can make it possible that, in the event that the hatch is closed by motor and is additionally moved manually in the direction of the closed position, a decrease in cable tension is compensated for by the coil spring. The cable pulley can be displaced in relation to the actuator using the unidirectional clutch. This can prevent the cable from being able to escape from a guide of the cable pulley. Of course, a different elastic preload element can also be used instead of a coil spring.

For example, the actuator can comprise an electric motor and a worm connected to the output side of the electric motor, which worm meshes with a worm gear which forms a portion of the cable pulley. The worm gear can be connected to the cable pulley or formed in one piece with it.

Figure 7:
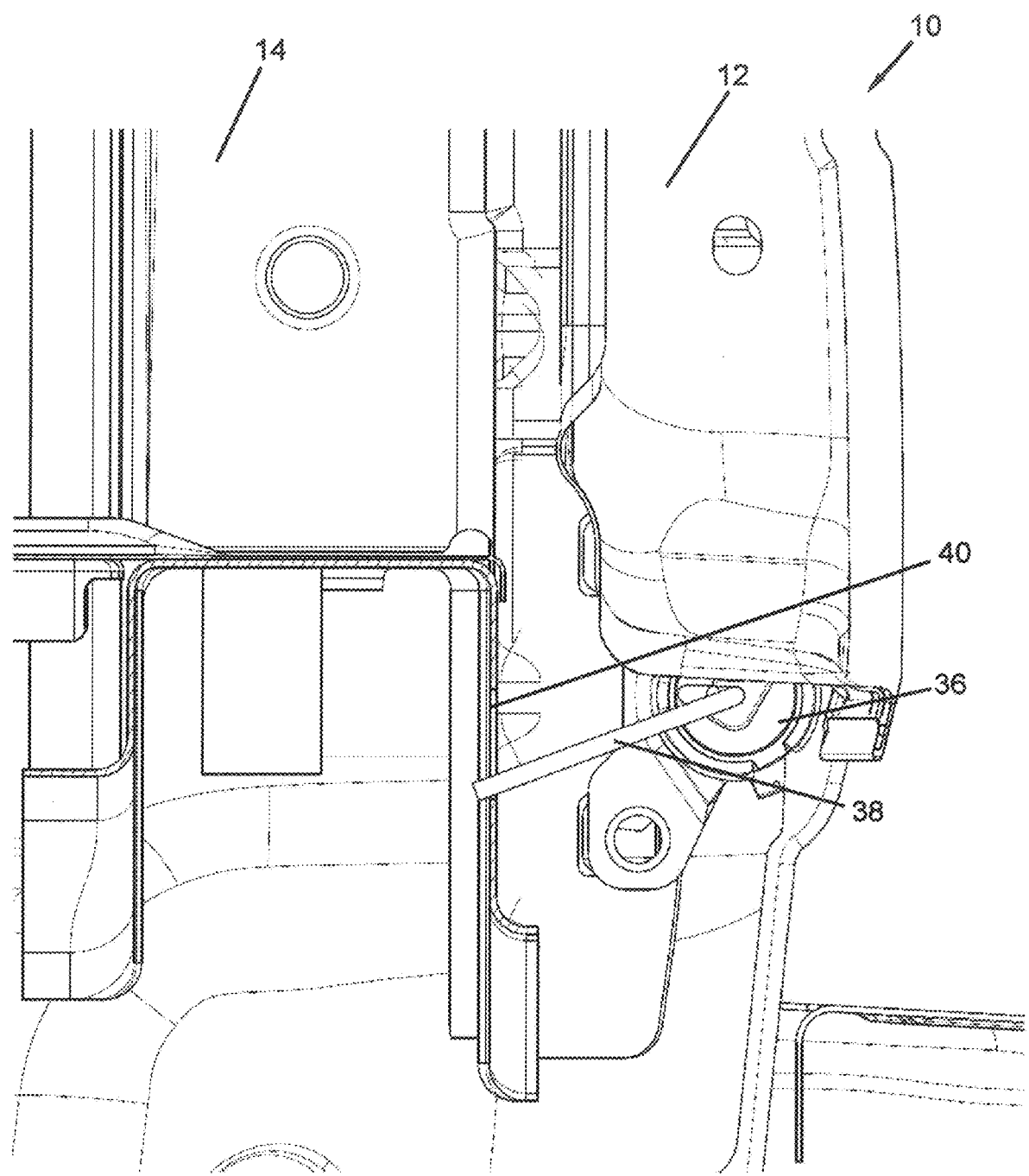
FIG. 7 is the hatch arrangement according to the invention, according to either FIG. 1, which is arranged in a first movement range.

In FIG. 7, the hatch 12 is shown in its completely closed position relative to the vehicle body 14. A torsion bar 36 is attached to the hatch 12. The torsion bar 36 has, in a generally known manner, two connecting portions, between which the torsion bar 36 generates a restoring torque when they are displaced relative to each other. The torsion bar 36 is connected with one of its connecting portions to the hatch 12, and a projection 38 is arranged on the other of its connecting portions. The projection 38 engages in a, for example, slot-like recess 40, and the projection 38 rests against the lower boundary thereof in FIG. 7, such that the torsion bar 36 generates a restoring torque which impels the hatch 12 relative to the vehicle body 14 in the direction of its open position. It is possible to prevent the torsion bar 36 from inadvertently displacing the hatch 12 in the direction of its open position, for example by using a locking mechanism which acts between the hatch 12 and the vehicle body 14. A movement range of the hatch 12 relative to the vehicle body 14 from the closed position shown in FIG. 7, which can be viewed as an angle of 0°, to the position of the hatch 12 relative to the vehicle body 14 in which the projection 36 just begins to lose contact with the lower boundary of the recess 40, can be regarded as a first partial movement range.

Figure 8:
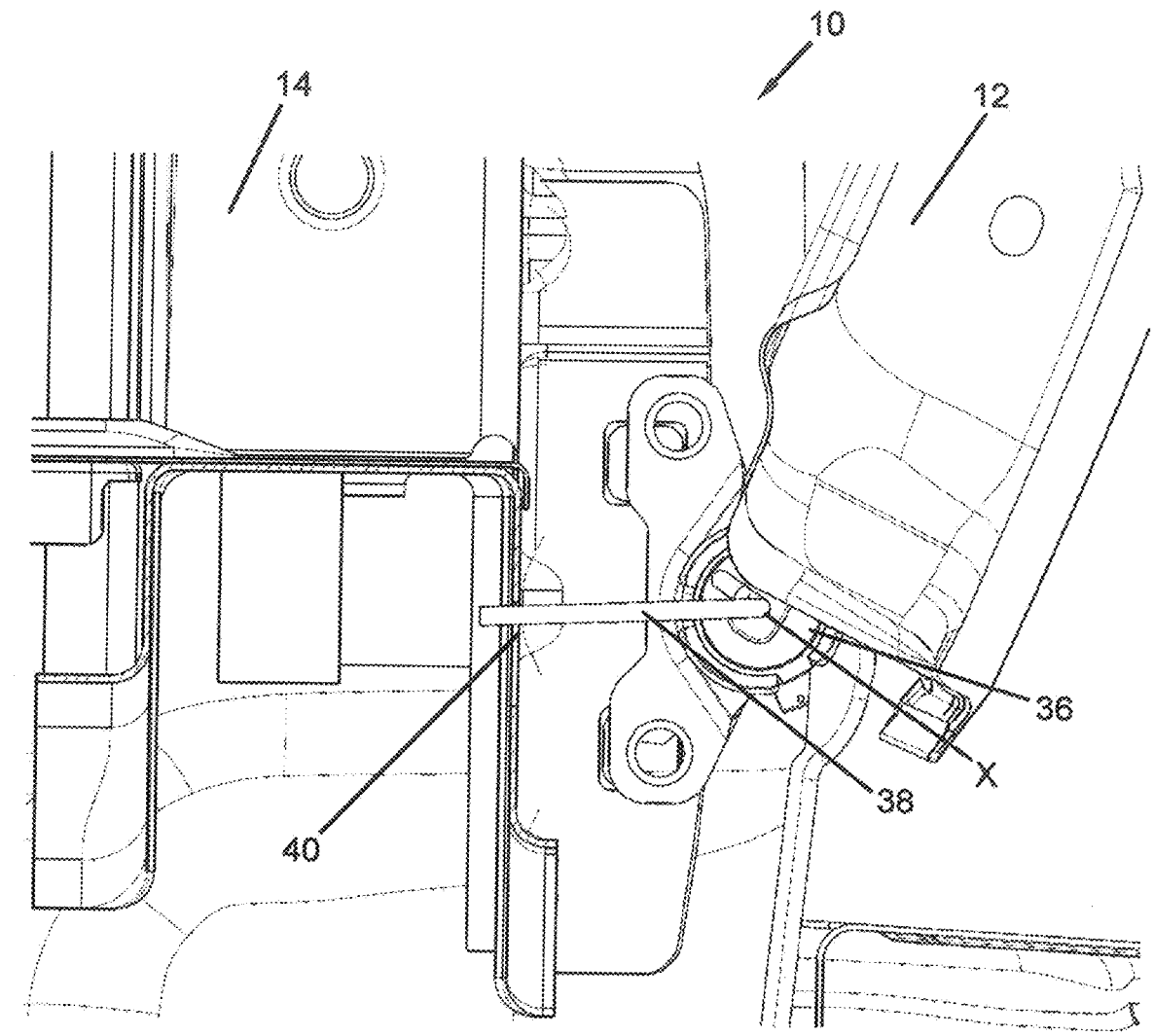
FIG. 8 is the hatch arrangement according to the invention, according to FIG. 1, which is arranged in a second movement range.

In FIG. 8, the hatch 12 is pivoted about the pivot axis X relative to the vehicle body 14 in such a way that the projection 38 rests neither against the lower boundary of the recess 40 nor against the upper boundary of the recess 40. In this state, the torsion bar 36 does not generate any restoring torque which acts on the hatch 12. The movement range of the hatch 12 relative to the vehicle body 14, extending from the position of the hatch 12 relative to the vehicle body 14 in which the projection 38 has just broken contact with the lower boundary of the recess 40 up to the position of the hatch 12 relative to the vehicle body 14 just before the projection 36 comes into contact with an upper boundary of the recess 40, can be regarded as a third partial movement range.

Figure 9:
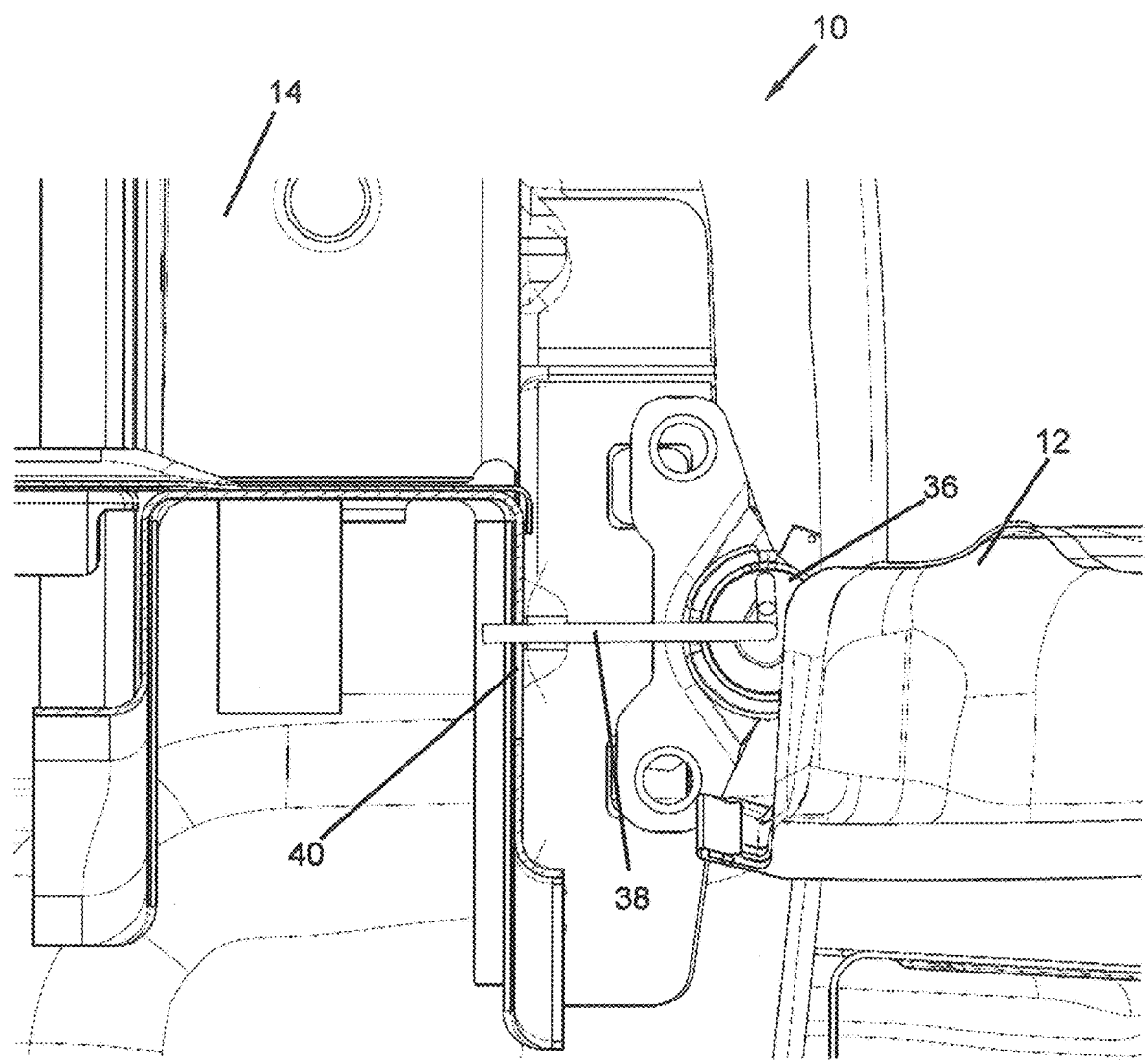
FIG. 9 is the hatch arrangement according to the invention, according to FIG. 1, which is arranged in a third movement range.

In FIG. 9, the hatch 12 is shown in its completely open position, as also shown in FIG. 1. The projection 38 is contacting the upper boundary of the recess 40. As a result, the torsion bar 36 generates a restoring moment which impels the hatch 12 in the direction of its closed position relative to the vehicle body 14. The movement range between the position in which the projection 36 just comes into contact with the upper boundary of the recess 40 and the position of the hatch 12 in its fully open position can be regarded as a second partial movement range.

Figure 10:
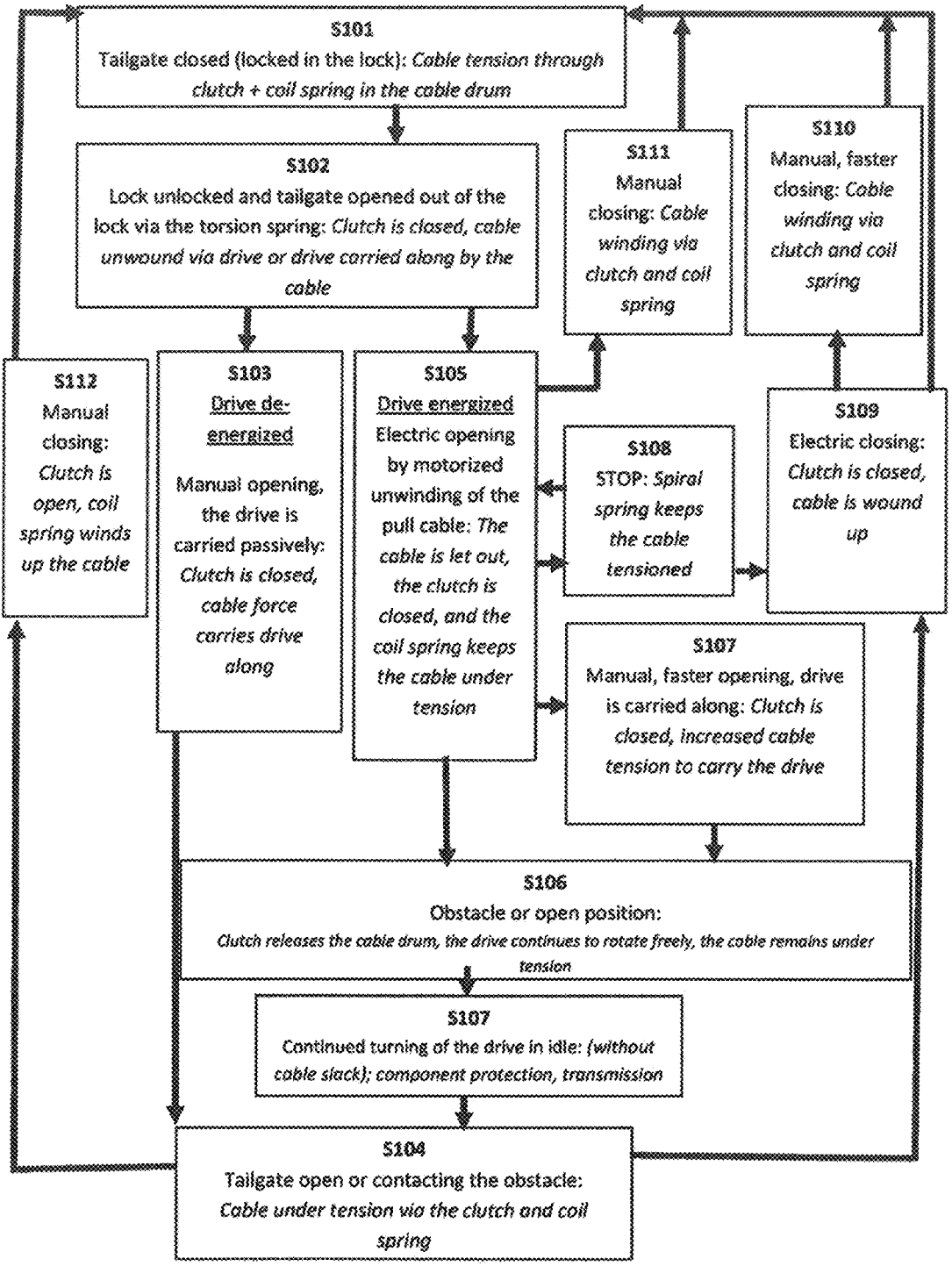
FIG. 10 is a flow chart of possible courses of action when the hatch arrangement is open or closed.

FIG. 10 shows a flow chart illustrating possible courses of action when the hatch arrangement is open or closed. Proceeding from the closed position of the tailgate, i.e. the hatch/tailgate of the hatch arrangement is locked in a lock on the vehicle body (step S101 in FIG. 10), the cable tension is generated in this closed position by the clutch and the coil spring in the cable drum. If the lock is unlocked and the tailgate is moved out of the closed position by the action of the torsion spring described above, the clutch is rotated in its blocking direction, i.e. the clutch is closed and the cable is unwound from the cable pulley via the actuator or, if the actuator does not rotate the cable pulley in relation to the movement of the tailgate sufficiently fast to unwind the cable, the drive/actuator is pulled along via the cable by the movement of the tailgate (step S102).

In a first case of step S103, the drive is operated without current—that is, the hatch is opened manually and the actuator is passively pulled along. The clutch remains closed and the actuator is operated by the cable force. If the tailgate has reached the end of its movement in the open position or has been stopped in an intermediate position, for example due to contact with an obstacle, the cable remains tensioned via the clutch and the coil spring (step S104).

In a second case (step S105), the actuator for driving the cable pulley is actively operated. In this case, the hatch is opened by the unwinding of the cable from the cable pulley due to the action of the actuator. This means that the cable is let out, the clutch is closed and the coil spring keeps the cable under tension. If the tailgate then reaches the open position or, as described above, comes to rest against an obstacle (step S106), the clutch releases the cable drum, such that the drive continues to rotate freely and the cable remains tensioned. In a subsequent step S107, the actuator can rotate in idle, such that components of the transmission can be protected without producing a significant decrease in the cable tension.

The action sequence then proceeds to the above-mentioned step S104, in which the cable is tensioned via the clutch and the coil spring.

As an alternative to step S106, when the actuator is actively operated to open the tailgate (step S105), the tailgate can also be manually moved in the direction of the open position, such that a speed of manual opening exceeds the speed of the motor drive speed of the actuator. In this case, the clutch is closed and the drive is pulled by manually moving the tailgate. This can lead to increased cable tension. The above-described step S106 then follows.

Furthermore, an active actuation of the actuator and thus a drive of the cable pulley can also be actively stopped (step S108) before the hatch has reached the open position or has come into contact with an obstacle. As during the unwinding of the cable, the coil spring will keep the cable under tension in this case as well. The active driving of the actuator (step S105) can then be continued, or the tailgate can be opened further manually (step S103) (not shown in FIG. 10). Alternatively, the actuator can be driven in a step S109 in such a way that the tailgate is moved in the direction of its closed position by the action of the actuator, which is to say by a motorized winding of the cable onto the cable pulley. The clutch is closed in this case, and the cable is wound onto the cable pulley. At the end of the movement path, the tailgate again reaches its closed position in accordance with step S101 described above.

When the tailgate closes under the action of the actuator, analogously to the motorized opening of the tailgate, the hatch can also be acted on by hand in such a way that a movement speed of the hatch in the direction of the closed position exceeds the speed at which the actuator winds the cable onto the cable pulley. In this case, a decrease in cable tension is compensated for via the clutch and the coil spring, such that the cable can be wound onto the cable pulley at a higher speed than the action of the actuator alone would allow (step S110). The action sequence then returns to step S101 when the tailgate has reached its closed position.

Of course, this manual closing can also take place without prior activation of the actuator in order to close the tailgate—for example, directly, while the actuator is still being operated in the opening direction of the tailgate. Analogously to step S110, in this case too the cable is wound onto the cable pulley via the clutch and the coil spring, such that the pull cable can be prevented from sagging.

In many cases, the tailgate will be moved into its open position (step S104), for example to load objects onto a loading area of a pick-up truck, and following step S104 the tailgate is then either closed electrically (step S109) or closed manually (step S112); in step S112, the clutch is opened and the coil spring winds the cable onto the cable pulley. The tailgate then reaches its closed position again (S101).

Of course, step S112 can also follow step S108 directly (not shown in FIG. 10).

It should be added at this point that a detection device can be connected to the actuator, which is configured, for example, to detect a position of the hatch, in particular a closed position, in order to deactivate or activate the actuator, for example.

Furthermore, the function of the combination of "cable, cable drum, clutch, motor drive" will be summarized again here in other words: The coil spring can preferably always have a spring preload—the lowest spring preload when the cable is wound up and the hatch is closed, the highest spring preload when the cable is unwound and the hatch is open. In order to be able to compensate for this resulting closing moment from the coil spring on the hatch, the torsion spring must initially exert an opening moment on the hatch, and then, at a greater opening angle of the hatch, the resulting opening moment which is exerted past the hatch's center of gravity (minus the torsion spring moment which is now closing) is required to continue to unwind the coil spring.

The clutch can in particular be arranged inside the cable drum and connect a cable drum axle driven by an electric motor to the cable drum. If the cable drum axle is driven by an electric motor in the winding direction of the cable, this is the blocking direction of the clutch, and the outer cable drum is carried along—that is, it also rotates in the winding direction of the cable and winds the cable, i.e., the hatch closes.

If the hatch is open and the cable drum axle is not driven by an electric motor in the winding direction of the cable, but the hatch is closed manually, the cable tension is reduced, the clutch is open in this direction of rotation and the cable drum can be driven by the coil spring preload, can rotate freely in the winding direction of the cable, and can keep the cable under tension and/or wind it up.

Even if the cable is unhooked from the hatch, for example to uninstall the tailgate, the cable will tend to lay completely around the cable drum due to the coil spring pretension. The cable wants to disappear into the drive, so to speak, and must be pulled out of the drive by hand against the force of the coil spring to once again attach it to the hatch.

The clutch in this arrangement can in principle have four states at the same time, which are always dependent on the direction of rotation of the outer cable drum relative to the inner driven cable drum axle, and on the speed and size of the cable tension of the outer cable drum relative to the inner cable drum axle.

These states are:

1. The cable drum axle is driven in the winding direction of the cable, the cable drum axle rotates faster than the cable drum, the clutch is closed, the cable drum is carried along at the speed of the cable drum axle, the cable winds up, the hatch closes;
2. The cable drum axle is driven in the winding direction of the cable, the cable drum axle rotates more slowly (or is stationary) than the cable drum (for example, a quick manual hatch closing gives a high cable drum speed), the clutch opens, the cable drum rotates faster than the cable drum axle (due to the coil spring), the cable is wound up quickly, the cable tension is always preserved;
3. The cable drum axle is driven in the unwinding direction of the cable, the cable tension is sufficiently high due to the opening moment on the hatch, the clutch is closed, the cable drum is allowed to unwind the cable at the speed of the cable drum axle in the unwinding direction of the cable. No matter how high the opening moment of the hatch (=cable force), the cable drum cannot unwind faster than the speed of the cable drum axle, the clutch is closed, "motor-braked opening speed".
4. The cable drum axle is driven in the unwinding direction of the cable, the cable tension is too low due to the opening moment on the hatch (e.g. the hatch is prevented from opening); because the opening moment is absent and the cable tension is thus greatly reduced, the coil spring, which wants to wind, is dominant, the clutch opens, the cable drum will stop, and if necessary will wind in the winding direction of the cable up to the cable tension associated with the coil spring force, even while the cable drum axle is motor-driven in the unwinding direction of the cable.

What is claimed is:
1. A drive device for a hatch, comprising:
a cable comprising two interconnected sections, wherein a first of the two interconnected sections comprises a sling cable and a second of the two interconnection sections comprises a pull cable;
a cable pulley connected to a first superordinate assembly and to the cable, wherein the cable pulley is configured to wind or unwind the cable according to a direction of rotation of the cable pulley, wherein the cable is further connected to a second superordinate assembly pivotably attached relative to the first superordinate assembly;
an actuator configured to drive the cable pulley;
at least one deflection unit which has a deflection roll over which the cable runs between the cable pulley and the second superordinate assembly;
wherein a first end of the sling cable is connected to the second superordinate assembly and a second end of the sling cable is connected by way of a cable coupling to a first end of the pull cable, and wherein a second end of the pull cable is connected to the cable pulley;
wherein the sling cable is sized in such a way that the sling cable is tensioned when an angle between the second superordinate assembly and the first superordinate assembly is substantially one hundred eighty degrees; and
wherein the pull cable is sized such that the cable coupling cannot be wound into the cable pulley.
2. The drive device of claim 1, wherein the cable comprises a stop element configured to come into contact with a counter stop formed on the deflection unit at an angle between the second superordinate assembly and the first superordinate assembly of approximately 180°, so as to prevent forces exerted on the sling cable by the second superordinate assembly from being introduced into the cable pulley.
3. The drive device of claim 1, wherein the cable coupling comprises a stop element.
4. The drive device of claim 1, wherein a support element is arranged between the deflection unit and the cable pulley, the cable being guided by the support element.
5. The drive device of claim 4, wherein the support element comprises a C-shaped rail arranged on the first superordinate assembly.
6. The drive device of claim 1, further comprising a torsion bar configured to generate a corresponding counter-torsional moment upon input of a torsional force the torsion bar;
wherein the torsion bar is supported on at least one of the first superordinate assembly or the second superordinate assembly and is movable between a first state of the torsion bar, which is associated with a closed position of the second superordinate assembly on the first superordinate assembly, and a second state of the torsion bar, which is associated to a maximally open position of the second superordinate assembly on the first superordinate assembly;
wherein the torsion bar is arranged in such a way that it is configured to apply a torque in a first direction over a first partial movement range of a total movement range between the first state of the torsion bar and the second state of the torsion bar;
wherein the first partial movement range extends from the first state of the torsion bar along the total movement range in the direction of the second state of the torsion bar, wherein the torsion bar is further arranged such that it is configured to apply a torque in a second direction opposite to the first direction over a second partial movement range of the total movement range; and
wherein the second partial movement range extends from the second state of the torsion bar along the total movement range in the direction of the first state of the torsion bar, and wherein the torsion bar is further arranged in such a way that it is configured not to apply any torque over a third partial movement range which is arranged between the first partial movement range and the second partial movement range.
7. The drive device of claim 6, wherein the torsion bar has at least one projection designed to engage in a recess formed in one of the first superordinate assembly or the second superordinate assembly, and wherein a movement path of the projection in the recess corresponds to the third partial movement range.
8. The drive device of claim 6, wherein the total movement range of the torsion bar extends over an angular range of at least 50° and at most 180°.
9. The drive device of claim 6, wherein the torsion bar extends over an angular range of approximately 90°.
10. The drive device of claim 1, wherein the cable pulley is provided with a unidirectional clutch, wherein the unidirectional clutch is configured to mount the cable pulley with free rotation relative to the actuator in the direction of rotation of the cable pulley in which the cable is wound onto the cable pulley.
11. The drive device of claim 10, wherein the unidirectional clutch is further configured to mount the cable pulley in a torque-proof manner relative to the actuator in the other direction of rotation of the cable pulley.
12. The drive device of claim 11, wherein a coil spring which is configured to exert a torque on the cable pulley in the winding direction of the cable pulley is assigned to the unidirectional clutch, such that the cable pulley is rotated relative to the actuator when the cable tension is released.

13. The drive device of claim 1, wherein the actuator comprises an electric motor and a worm connected to an output side of the electric motor, wherein the worm meshes with a worm gear which forms a portion of the cable pulley.

14. The drive device of claim 1, wherein the second superordinate assembly is a hatch.

15. The drive device of claim 1, wherein the first superordinate assembly is a vehicle body.

16. The drive device of claim 1, wherein the first superordinate assembly comprises a vehicle body and the second superordinate assembly comprises a hatch, and wherein the hatch is connected with articulation to the vehicle body to close off a portion of the vehicle body.

17. The drive device of claim 1, wherein the sling cable serves to absorb weight and loading forces in an open position of the second superordinate assembly.

18. The drive device of claim 1, wherein the sling cable is pulled over the deflection unit by the pull cable in the direction of the cable pulley when the hatch is closed.

19. A hatch arrangement, comprising:
  a vehicle body;
  a hatch connected to the vehicle body with articulation, wherein the vehicle body comprises a portion to be closed off by the hatch; and
  a drive device comprising:
    a cable having two interconnected sections, wherein a first of the two interconnected sections comprises a sling cable and a second of the two interconnection sections comprises a pull cable;
    a cable pulley connected to the vehicle body and to the cable, wherein the cable pulley is configured to wind or unwind the cable according to a direction of rotation of the cable pulley, wherein the cable is further connected to the hatch;
    an actuator configured to drive the cable pulley;
    at least one deflection unit which has a deflection roll over which the cable runs between the cable pulley and the hatch;
    wherein a first end of the sling cable is connected to the hatch and a second end of the sling cable is connected by way of a cable coupling to a first end of the pull cable, and wherein a second end of the pull cable is connected to the cable pulley;
    wherein the sling cable is sized in such a way that the sling cable is tensioned when an angle between the hatch and the vehicle body is substantially one hundred eighty degrees; and
    wherein the pull cable is sized such that the cable coupling cannot be wound into the cable pulley.

20. The hatch arrangement of claim 19, wherein the cable comprises a stop element configured to come into contact with a counter stop formed on the deflection unit at an angle between the hatch and the vehicle body of approximately 180°, so as to prevent forces exerted on the sling cable by the hatch from being introduced into the cable pulley.

* * * * *